(12) United States Patent
Wang et al.

(10) Patent No.: US 10,576,534 B2
(45) Date of Patent: Mar. 3, 2020

(54) MOLD FOR IMPROVING SOLIDIFICATION SPEED OF ALUMINUM ALLOY CAST HOT SECTION

(71) Applicant: CITIC Dicastal CO., LTD., Qinhuangdao, Hebei (CN)

(72) Inventors: Kaiqing Wang, Qinhuangdao (CN); Xianyi Xu, Qinhuangdao (CN); Changhai Li, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 16/220,299

(22) Filed: Dec. 14, 2018

(65) Prior Publication Data
US 2019/0291174 A1    Sep. 26, 2019

(30) Foreign Application Priority Data
Mar. 22, 2018   (CN) .......................... 2018 1 0240037

(51) Int. Cl.
| | |
|---|---|
| *B22C 9/06* | (2006.01) |
| *B22C 9/28* | (2006.01) |
| *B22D 18/04* | (2006.01) |
| *B60B 3/06* | (2006.01) |

(52) U.S. Cl.
CPC ................ *B22C 9/065* (2013.01); *B22C 9/28* (2013.01); *B22D 18/04* (2013.01); *B60B 3/06* (2013.01); *B60B 2360/104* (2013.01); *B60B 2360/147* (2013.01)

(58) Field of Classification Search
CPC ............ B22C 9/065; B22C 9/28; B22D 18/04
See application file for complete search history.

(56) References Cited

U.S. PATENT DOCUMENTS

| | | | | |
|---|---|---|---|---|
| 5,427,171 A | * | 6/1995 | Prieto ....................... | B22C 9/28 |
| | | | | 164/132 |
| 5,647,426 A | | 7/1997 | Prieto | |
| 2016/0368043 A1 | * | 12/2016 | Zhou ......................... | B22C 9/28 |
| 2017/0291212 A1 | * | 10/2017 | Zhu ........................ | B22D 18/04 |

FOREIGN PATENT DOCUMENTS

| | | |
|---|---|---|
| CN | 201913193 U | 8/2011 |
| CN | 203184631 U | 9/2013 |
| CN | 203281848 U | 11/2013 |
| CN | 204108286 U | 1/2015 |

(Continued)

*Primary Examiner* — Kevin E Yoon
(74) *Attorney, Agent, or Firm* — Cooper Legal Group, LLC

(57) ABSTRACT

A mold for improving solidification speed of an aluminum alloy cast hot section includes a top mold, a side mold and a lower mold, the top mold arranged at top and configured to complete a back cavity of a wheel, the bottom mold being arranged below the top mold and configured to complete shaping of a front wheel disc of the wheel, the side mold being arranged on side of the top mold and bottom mold, the top mold, side mold and bottom mold jointly surrounding a cast cavity of the aluminum alloy wheel, the center of the top mold includes a step hole through which a shunt cone is mounted, the shunt cone is connected with the top mold by bolts; the upper part of the shunt cone is assembled with the center hole of the top mold of the mold, the two are in zero clearance fit.

10 Claims, 3 Drawing Sheets

(56) References Cited

FOREIGN PATENT DOCUMENTS

| | | | | | |
|---|---|---|---|---|---|
| CN | 205309270 | U | * | 6/2016 | |
| CN | 105750507 | A | * | 7/2016 | ............. B21D 22/02 |
| CN | 206286536 | U | | 6/2017 | |
| CN | 206536010 | U | | 10/2017 | |
| CN | 206605025 | U | | 11/2017 | |
| CN | 207941960 | U | | 10/2018 | |
| JP | H11226716 | A | | 8/1999 | |
| JP | 2009297739 | A | | 12/2009 | |

* cited by examiner

MOLD FOR IMPROVING SOLIDIFICATION SPEED OF ALUMINUM ALLOY CAST HOT SECTION

CROSS-REFERENCE TO RELATED APPLICATIONS

The present application claims benefit of Chinese Patent Application No. 201810240037.X, filed on Mar. 22, 2018, the contents of which are hereby incorporated by reference in its entirety.

BACKGROUND

With rapid development of the automotive industry, people's requirement for vehicle safety has become increasingly strict. As a key safety component in automotive systems, wheels need to continuously improve their performance quality in order to keep up with the increasingly fierce market competition.

The structure of each part of a wheel plays an important safety role in the driving of a vehicle. A wheel center flange is the key part of connecting the wheel with an automotive transmission main shaft, so each main engine factory has set a high standard for its casting quality and mechanical properties. In order to achieve the strength of use, the wheel center is often designed to be relatively thick. For some European and Japanese models, the thickness will even be more than 60 mm (area A in FIG. 1). An obvious cast hot section is thus formed, which seriously affects the formulation of a process plan and is the most vulnerable part in the production.

At present, for the cooling of the wheel center, the conventional air-cooled structure is still the most common way for many aluminum wheel manufacturers. This technique is easy to control and low in cost, but at the same time, has obvious deficiencies: the compressed air has very small heat capacity and low thermal conductivity, so that the heat concentrated in the wheel center cannot be quickly exported, causing low solidification speed of molten aluminum and defects such as shrinkage will be occur in the interior of the casting; due to the low supercooling degree of air cooling, crystal grains at the wheel center tend to be very large, resulting in a loose structure and low mechanical properties; in addition, the wheel center, as a filling and feeding source of the molten aluminum, is not desired to be solidified prematurely, but needs to be rapidly and forcibly cooled at the later stage of the process, and it is clear that the air cooling cannot meet this requirement. Therefore, how to cool the thick and large hot section of the wheel center, ensure a reasonable solidification interval and complete good sequential solidification is an important issue for many casting craftsmen.

Based on the above analysis, in the face of increasing product quality requirements, the existing technical means have been difficult to meet, so certain optimization and improvement are needed to solve the problem of casting production and improve the forming quality of castings.

SUMMARY

The present disclosure relates to the field of casting, specifically to a top mold cooling structure of an aluminum wheel low-pressure casting mold capable of significantly accelerating the solidification of a central hot section of a wheel casting and improving the mechanical properties of a wheel center.

The object of the present disclosure is to overcome the deficiencies of the prior art and propose an improved central cooling structure of a low-pressure casting wheel mold. The novel structure can effectively solve the problem that the flange area of the wheel center of a wheel casting is prone to shrinkage, large grain size and low mechanical properties and the like, thereby improving the production quality and the overall yield.

In one aspect of the present disclosure, there is provided a mold for improving the solidification speed of an aluminum alloy cast hot section, the mold including a top mold, a side mold and a lower mold, the top mold being arranged at the top and configured to complete a back cavity of a wheel, the bottom mold being arranged below the top mold and configured to complete shaping of a front wheel disc of the wheel, the side mold being arranged on the side of the top mold and the bottom mold, and the top mold, the side mold and the bottom mold jointly surrounding a cast cavity of the aluminum alloy wheel, in which the center of the top mold includes a step hole, a shunt cone is mounted through the step hole, and the shunt cone is connected with the top mold by bolts; the upper part of the shunt cone is assembled with the center hole of the top mold of the mold, and the two are in zero clearance fit; the axial assembly height of the upper part of the shunt cone and the center hole of the top mold of the mold is 8-12 mm; the lower end of the shunt cone includes a disk-shaped cooling portion, an annular water channel is provided in the cooling portion, the outer diameter of the cooling portion is identical to the outer ring of a top mold flange, and the water channel is coaxial with the top mold of the mold; the cross section of the water channel is U-shaped, the root of the water channel is 6-8 mm from the lower end surface of the shunt cone, the root of the water channel is rounded, and the arc diameter is 1.5-2.5 mm; the roughness of the bottom surface of the shunt cone is less than 1.6; the water channel of the shunt cone is concentrically distributed in two rings, the inner ring corresponds to the flange weight reduction socket of the wheel, and the outer ring is arranged at the joint of the spoke and the flange of the wheel; the side wall of the cooling portion includes diversion holes, and the diversion holes connect the inner and outer water channels; an annular cover plate covers the water channel of the shunt cone, and water inlet pipes and a water outlet pipe are arranged on openings of the cover plate; the top of the upper part of the shunt cone includes a connecting portion, and the connecting portion is connected to a branch pipe; the center of the shunt cone includes a deep water hole extending all the way to the lower cone head of the shunt cone.

The shunt cone is made of 2Cr13 stainless steel, and the top mold and the bottom mold are made of H13 mold steel.

The lower end of the shunt cone is designed in a spindle shape, and the diameter of the rounded portion is 8 mm or more.

The connecting bolts between the shunt cone and the top mold are M16 bolts and include five bolts, and the screw-in depth of the threads is 20 mm or more.

The axial assembly height of the upper part of the shunt cone and the center hole of the top mold of the mold is 10 mm.

The cooling portion at the lower part of the shunt cone has a thickness of 25-30 mm.

The distance between the two side edges of the water channel is 8-10 mm, and the distance between the upper and lower edges is 8-10 mm.

The middle of the outer ring of the water channel includes a baffle, which divides the water channel of the outer ring into two parts.

The diameter of the diversion holes is 8 mm.

The annular cover plate is made of Q235 stainless steel, the upper end surface of the cover plate is provided with a groove, and two water inlet pipes and one water outlet pipe are arranged on the cover plate.

The connection strength is ensured by setting five bolt connections and setting the screw-in depth of the bolts. By selecting a novel shunt cone and materials, it has the characteristics of high strength and good wear resistance and corrosion resistance, and has a long service life. In order to achieve smooth shunt filling of molten aluminum and reduce the risk of corrosion, the cone head is designed in a spindle shape, and the contour line requires a smooth transition. The selection of the axial assembly heights of the upper part of the shunt cone with the center hole of the top mold of the mold enables the shunt cone to be securely mounted, and avoids the problems such as difficulty in disassembly and assembly. The root of the water channel is rounded to avoid water channel cracking and reduce stress concentration points. Excellent heat conductivity is ensured by defining the finishing roughness of the lower end surface of the cooling portion.

Compared with the existing solution, the new mold design has a significant improvement effect: the material elongation of the wheel center area is improved by more than 50%, the casting defects such as shrinkage is reduced by about 80%, the secondary dendrite spacing is reduced by 40%, and the production cycle of the single casting is shortened by about 30 s.

The present disclosure has a simple structure; the novel top mold center cooling form and the optimized shunt cone structure form a double cooling channel of the central water hole and the outer water channel, and preferably take into consideration the entire wheel center flange area; by means of strong heat storage capacity of the cooling water and excellent thermal conductivity of the graphite gasket, the accumulated heat is quickly and efficiently exported, the hot section is quickly solidified and crystallized, and the casting defects such as shrinkage are eliminated; by increasing the degree of supercooling, the internal grain structure is also significantly refined, and the mechanical properties of the wheel center are improved; in addition, the production cycle is obviously shortened, the production efficiency is improved, and the high-quality production of wheel castings is realized.

BRIEF DESCRIPTION OF DRAWINGS

The embodiments of the present disclosure will be described in detail below in combination with the accompanying drawings, in which.

LIST OF REFERENCE SYMBOLS

Figure 1:
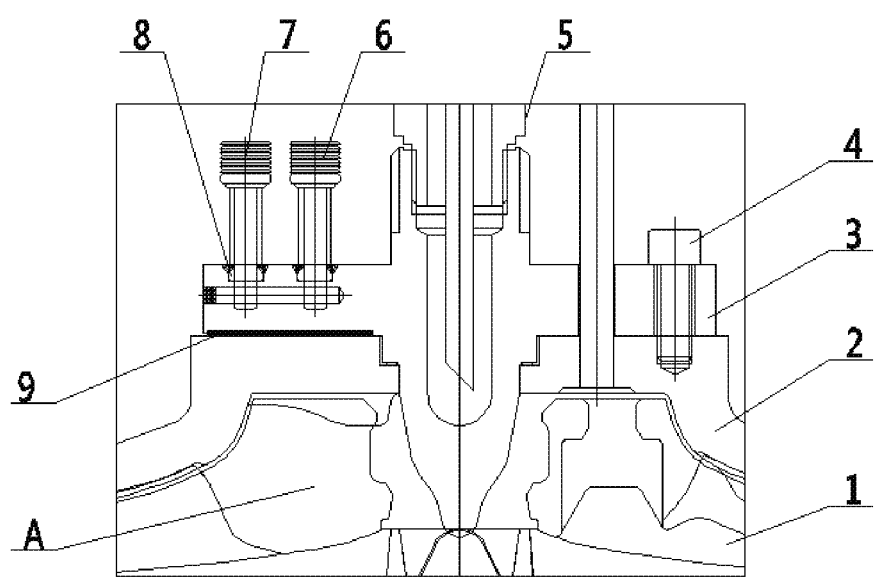
FIG. 1 is an assembly diagram of an improved low-pressure casting wheel mold according to the present disclosure.
Figure 2:
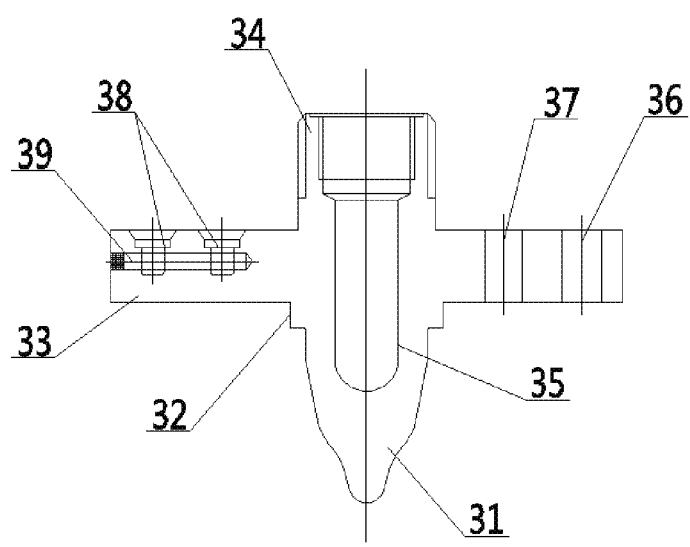
FIG. 2 is a structure diagram of a novel shunt cone according to the present disclosure.
Figure 3:
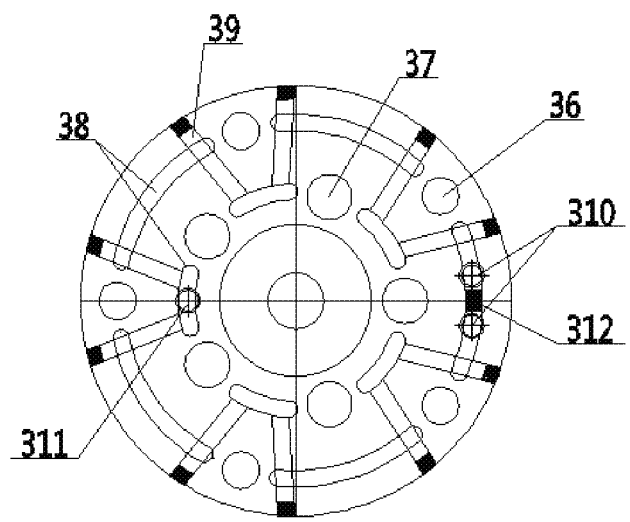
FIG. 3 is a design diagram of a shunt cone cooling structure according to the present disclosure.

1 bottom mold
2 top mold
3 shunt cone
31 cone head
32 shoulder portion
33 cooling portion
34 connecting portion
35 deep water hole
36 bolt through hole
37 ejector rod through hole
38 annular water channel
39 diversion hole
310 water inlet
311 water outlet
312 baffle
4 bolt
5 branch pipe
6 water outlet pipe
7 water inlet pipe
8 cover plate
9 thermal gasket

DETAILED DESCRIPTION

In the present embodiment, a novel wheel low-pressure casting mold structure is disclosed, including: a bottom mold 1, a top mold 2, a shunt cone 3, bolts 4, a branch pipe 5, a water outlet pipe 6, water inlet pipes 7, a cover plate 8 and a thermal gasket 9.

In order to ensure good use state and thermal conductivity of the mold, the top mold and the bottom mold are made of high-quality alloy mold steel H13; a step hole for mounting the shunt cone 3 is machined in the center of the top mold 2, both of them are fastened by five M16 bolts 4, and the screw-in depth of the threads is required to be more than 20 mm to ensure the connection strength; the novel shunt cone 3 is made of 2Cr13 with high strength, good wear resistance and corrosion resistance and long service life; in order to achieve smooth shunt filling of molten aluminum and reduce the risk of corrosion, the cone head 31 is designed in a spindle shape, the contour line requires a smooth transition, and the rounded corner size R is more than 8 mm; the upper end of the cone head 31 is a shoulder portion 32 of the shunt cone, which is assembled with the center hole of the top mold 2, and the two are designed in zero clearance fit; the axial overlap height is determined to be 10 mm, the shunt cone will not be mounted securely if it is too short, and the shunt cone will be difficult to disassemble and assemble if it is too long; the largest size structure of the shunt cone is a cooling portion 33, which is the main working portion and is in a disk shape; the outer diameter of the cooling portion 33 is identical to the outer ring of a top mold flange, and the thickness is designed to be 25-30 mm; the cooling portion 33 is machined with a water channel 38, which is of an annular structure and is designed coaxially with the mold to ensure the uniformity of cooling in the circumferential direction of a casting; the cross section of the water channel 38 is U-shaped and the size is 8×10 mm, which guarantees a large enough division channel; the root of the water channel is 6-8 mm from the lower end surface, and the rounded corner is designed to be R 2 mm to eliminate stress concentration points and reduce the risk of water channel cracking; the lower end surface of the cooling portion 33 is a main heat conduction surface, which must be finished to ensure Ra<1.6 so as to achieve excellent thermal conductivity; the annular water channel 38 is divided into an inner water channel and an outer water channel designed concentrically; the inner water channel corresponds to a flange weight reduction socket, and the outer water channel is arranged at the joint of the spoke and the flange; a baffle 312 is welded to the middle of the outer water channel on the axis, has a thickness of 10 mm, and equally divides the water channel into two parts; diversion holes 39 are drilled in the side wall of the cooling portion 33, with the open ends sealed; the diversion holes 39 have a diameter of φ8 mm, and penetrate the inner and outer water channels to realize the communication of the water channel and form a complete cooling water circulation channel; the diversion holes 39 need to be machined with a special ball-end drill to avoid sharp shapes and reduce the risk of mold cracking; according to the characteristics of the wheel model, ejector rod through holes 37 having a diameter of φ18 mm are arranged at intervals of the inner water channel; five bolt mounting holes 36 having a diameter of φ18 mm are machined in the middle of the outer water channel; the annular cover plate 8 is made of Q235 and used for sealing each water channel; a groove of C4 is formed in the upper end surface of the cover plate 8 to ensure the depth of a weld pool and improve the welding strength; in the production, a strict welding process needs to be established to avoid welding seam cracking during the use of the water channel and water channel leakage, so as to prolong the service life of the mold and reduce the production cost; two water inlets 310 are machined in one outer cover plate and symmetrically distributed along the center surface, the hole distance is 16 mm, and the diameter is φ14 mm; the cover plate will be used with the water channel welded with the middle baffle, and the water inlets are distributed on the two sides of the baffle; one water outlet 311 having a diameter of φ14 mm is machined in one inner cover plate and located in the middle of the cover plate, and this cover plate will be used with the inner channel on the axis; the two inner and outer channels described above are arranged symmetrically at 180°; the water inlet pipes 7 and the water outlet pipe 6 are welded to water holes of the cover plate, and are made of stainless steel to reduce the corrosion of the water pipes; there are two water inlet pipes 7, having the outer diameter of φ14 mm and the inner diameter of φ 10 mm; there is one water outlet pipe 6, having the outer diameter of φ14 mm and the inner diameter of φ12 mm; the inner diameter of the water outlet pipe is designed to be 1.2 times the inner diameter of the water inlet pipes, which can reduce the adverse effects caused by the accumulation of scales at the water outlet, thereby ensuring the same inlet and outlet flow; the water inlet and outlet pipes are respectively connected to a cooling water storage device of a machine to form a complete annular water cooling channel in the form of double inlets and single outlet, and such design can ensure the uniformity and strength of cooling to the utmost extent; the top of the shunt cone is a connecting portion 34, which is assembled with the branch pipe 5; a deep water hole 35 having a diameter of φ22 mm is machined in the center of the shunt cone, the bottom thereof extends into the cone head 31 and is 10-15 mm from the outer surface, and the rounded corner size of the root is R 11 mm; after the assembly is completed, the open end of the cooling pipeline of the branch pipe 5 is designed to be 8-12 mm from the root of the water hole; in actual production, the cooling function of the cone head to the riser can be realized by air cooling or water cooling according to the characteristics of the wheel model; the gasket 9 having the thickness of 2 mm is made of graphite or red copper, the former has better thermal conductivity but higher cost, while the latter is the opposite; the gasket 9 is placed between the top mold cooling surface and the shunt cone; the top mold 2, the gasket 9 and the shunt cone 3 are connected into a whole by fastening of the bolts 4, and the heat on the top mold 2 is transferred to the shunt cone 3 through the gasket 9, and then circulated away by the cooling water in the shunt cone 3, thereby achieving cooling of the mold; after the installation is completed, the compression amount of the gasket 9 is required to be about 50% to achieve a close fit and to ensure an excellent heat conduction effect; when the mold is maintained off line, the state of the gasket should be carefully checked; once the gasket is broken, it should be replaced immediately and then reassembled, so as not to affect the stability of the process; the novel shunt cone design forms two cooling lines: 1) concentrated cooling of the water hole of the riser by the cone head, and 2) cooling of the flange area by the water channel at the disk portion, thereby better considering the entire central hot section of the wheel casting, and achieving more rapid, uniform and stable cooling; in actual production, the process plan is as follows: 1) the cooling by the cone head is generally started within 30-50 s before the end of pressure holding, the water cooling flow rate is 400-600 L/h and the air cooling flow rate is 80-100 $m^3$/h, and 2) the cooling by the annular water channel is generally used within 20-40 s before the central cooling is started, and the water cooling flow rate is 100-200 L/h; and the die casting implemented according to the above parameters can achieve continuous and stable production without defects in the center flange area.

Compared with the existing solution, the new mold design has a significant improvement effect: the material elongation of the wheel center area is improved by more than 50%, the casting defects such as shrinkage are reduced by about 80%, the secondary dendrite spacing is reduced by 40%, and the production cycle of the single casting is shortened by about 30 s.

The invention claimed is:
1. A mold for improving a solidification speed of an aluminum alloy cast hot section, the mold comprising a top mold, a side mold and a bottom mold, the top mold being arranged at a top and configured to complete a back cavity of a wheel, the bottom mold being arranged below the top mold and configured to complete shaping of a front wheel disc of the wheel, the side mold being arranged on a side of the top mold and the bottom mold, and the top mold, the side mold and the bottom mold jointly surrounding a cast cavity of the wheel, wherein a center of the top mold comprises a step hole, a shunt cone is mounted through the step hole, and the shunt cone is connected with the top mold by bolts; an upper part of the shunt cone is assembled with a center hole of the top mold of the mold, and the upper part of the shunt cone and the center hole of the top mold of the mold are in zero clearance fit; an axial assembly height of the upper part of the shunt cone and the center hole of the top mold of the mold is 8-12 mm; a lower end of the shunt cone comprises a disk-shaped cooling portion, an annular water channel is provided in the disk-shaped cooling portion, an outer diameter of the disk-shaped cooling portion is identical to an outer ring of a top mold flange, and the annular water channel is coaxial with the top mold of the mold; a cross section of the annular water channel is U-shaped, a root of the annular water channel is 6-8 mm from a lower end surface of the shunt cone, the root of the annular water channel is rounded, and an arc diameter is 1.5-2.5 mm; a roughness of a bottom surface of the shunt cone is less than 1.6; the annular water channel of the shunt cone is concentrically distributed in two rings, an inner ring of the two rings corresponds to a flange weight reduction socket of the wheel, and an outer ring of the two rings is arranged at a joint of a spoke and a flange of the wheel; a side wall of the disk-shaped cooling portion comprises diversion holes, and the diversion holes connect the inner ring and the outer ring;

an annular cover plate covers the annular water channel of the shunt cone, and water inlet pipes and a water outlet pipe are arranged on openings of the annular cover plate; a top of the upper part of the shunt cone comprises a connecting portion, and the connecting portion is connected to a branch pipe; a center of the shunt cone comprises a deep water hole extending all the way to a lower cone head of the shunt cone.

2. The mold for improving a solidification speed of an aluminum alloy cast hot section according to claim 1, wherein the shunt cone is made of 2Cr13 stainless steel, and the top mold and the bottom mold are made of H13 mold steel.

3. The mold for improving a solidification speed of an aluminum alloy cast hot section according to claim 1, wherein the lower end of the shunt cone is designed in a spindle shape, and a diameter of a rounded portion is 8 mm or more.

4. The mold for improving a solidification speed of an aluminum alloy cast hot section according to claim 1, wherein the bolts between the shunt cone and the top mold are M16 bolts and include five bolts, and a screw-in depth of threads of the bolts is 20 mm or more.

5. The mold for improving a solidification speed of an aluminum alloy cast hot section according to claim 1, wherein the axial assembly height of the upper part of the shunt cone and the center hole of the top mold of the mold is 10 mm.

6. The mold for improving a solidification speed of an aluminum alloy cast hot section according to claim 1, wherein the disk-shaped cooling portion at the lower end of the shunt cone has a thickness of 25-30 mm.

7. The mold for improving a solidification speed of an aluminum alloy cast hot section according to claim 1, wherein a distance between two side edges of the annular water channel is 8-10 mm, and a distance between upper and lower edges is 8-10 mm.

8. The mold for improving a solidification speed of an aluminum alloy cast hot section according to claim 1, wherein a middle of the outer ring of the annular water channel comprises a baffle, which divides the outer ring of the annular water channel into two parts.

9. The mold for improving a solidification speed of an aluminum alloy cast hot section according to claim 1, wherein a diameter of the diversion holes is 8 mm.

10. The mold for improving a solidification speed of an aluminum alloy cast hot section according to claim 1, wherein the annular cover plate is made of Q235 stainless steel, an upper end surface of the annular cover plate is provided with a groove, and two water inlet pipes and one water outlet pipe are arranged on the annular cover plate.

* * * * *